(12) United States Patent
Kish et al.

(10) Patent No.: US 11,907,847 B2
(45) Date of Patent: *Feb. 20, 2024

(54) OPERATING MACHINE-LEARNING MODELS ON DIFFERENT PLATFORMS

(71) Applicant: Cogniac, Corp., San Jose, CA (US)

(72) Inventors: William S Kish, Saratoga, CA (US); Huayan Wang, Milpitas, CA (US); Sandip C. Patel, San Jose, CA (US)

(73) Assignee: Cogniac, Corp, San Jose, CA (US)

(*) Notice: Subject to any disclaimer, the term of this patent is extended or adjusted under 35 U.S.C. 154(b) by 326 days.

This patent is subject to a terminal disclaimer.

(21) Appl. No.: 17/182,254

(22) Filed: Feb. 23, 2021

(65) Prior Publication Data

US 2021/0174212 A1 Jun. 10, 2021

Related U.S. Application Data (63) Continuation of application No. 15/199,942, filed on Jun. 30, 2016, now Pat. No. 11,100,398.

(51) Int. Cl.
 *G06N 3/084* (2023.01)
 *G06N 3/063* (2023.01)
 *G06N 20/00* (2019.01)
 *G06N 3/082* (2023.01)

(52) U.S. Cl.
 CPC .............. *G06N 3/084* (2013.01); *G06N 3/063* (2013.01); *G06N 20/00* (2019.01); *G06N 3/082* (2013.01)

(58) Field of Classification Search
 None
 See application file for complete search history.

(56) References Cited

U.S. PATENT DOCUMENTS

| | | | |
|---|---|---|---|
| 9,164,874 B1* | 10/2015 | Tomay | G06F 11/366 |
| 11,100,398 B2* | 8/2021 | Kish | G06N 3/063 |
| 2015/0081598 A1* | 3/2015 | Depizzol | G06F 8/35 706/12 |
| 2015/0339216 A1* | 11/2015 | Wade | G06F 11/3664 714/38.1 |
| 2017/0339021 A1* | 11/2017 | Dukatz | H04L 41/145 |

* cited by examiner

*Primary Examiner* — Brian M Smith
(74) *Attorney, Agent, or Firm* — Steven Stupp (57) ABSTRACT

An electronic device may determine whether a machine-learning model is operating within predefined limits. In particular, the electronic device may receive, from another electronic device, instructions for the machine-learning model, a reference input and a predetermined output of the machine-learning model for the reference input. Note that the instructions may include an architecture of the machine-learning model, weights associated with the machine-learning model and/or a set of pre-processing transformations for use when executing the machine-learning model on images. In response, the electronic device may configure the machine-learning model based on the instructions. Then, the electronic device may calculate an output of the machine-learning model for the reference input. Next, the electronic device may determine whether the machine-learning model is operating within predefined limits based on the output and the predetermined output.

20 Claims, 7 Drawing Sheets

OPERATING MACHINE-LEARNING MODELS ON DIFFERENT PLATFORMS

CROSS-REFERENCE TO RELATED APPLICATION

This application is a continuation of U.S. patent application Ser. No. 15/199,942, "Operating Machine-Learning Models on Different Platforms," by William S. Kish, et al., filed on Jun. 30, 2016, the contents of which are hereby incorporated by reference.

FIELD

The described embodiments relate to a technique for disseminating a machine-learning model with reference information and predetermined outputs so that correct operation of the machine-learning model on different platforms, including different electronic devices and/or in different environments, can be verified.

BACKGROUND

Ongoing advances in the capabilities of electronic devices are making them increasingly popular. In addition, the widespread availability of electronic devices and their increasing functionality has resulted in a large number of applications.

For example, many electronic devices include imaging sensors, such as CMOS image sensors, that users and applications use to acquire images and videos. The content in these images and videos often includes useful information for the users. In principle, if the associated subset of the content that includes the information can be accurately identified, additional value-added services can be provided to the users.

In practice, it can be difficult to accurately identify the subset of the content (which are sometimes referred to as 'features') in the images. In particular, a detector, such as a machine-learning model, that attempts to identify features may be trained on an electronic device (such as a computer system) using images in a training dataset. Then, the detector may be distributed to another electronic device, which implements and executes the detector in an attempt to process the images.

However, there are often differences between the electronic device and the other electronic device. These differences can adversely impact the detector, and thus the accuracy of the subsequent feature identification. Because these limitations constrain and degrade the quality of the identified features, they are also frustrating for the users and can adversely impact the user experience.

SUMMARY

The described embodiments relate to an electronic device that determines whether a machine-learning model is operating within predefined limits. In particular, the electronic device optionally includes an imaging sensor that captures images, and an interface circuit that communicates, via a network, with another electronic device. The electronic device may include a processor, and memory that stores a program module. During operation, the processor executing the program module may receive, from the other electronic device, instructions for a machine-learning model, a reference input and a predetermined output of the machine-learning model for the reference input, where the instructions include an architecture of the machine-learning model, weights associated with the machine-learning model and/or a set of pre-processing transformations for use when executing the machine-learning model on the images. In response, the processor may configure the machine-learning model based on the instructions. Then, the processor may calculate an output of the machine-learning model for the reference input. Next, the processor may determine whether the machine-learning model is operating within the predefined limits based on the output and the predetermined output.

Note that the machine-learning model may include a neural network.

Moreover, the instructions for the machine-learning model may be based on training performed in a different computing environment than that of the electronic device (such as in a computer system).

Furthermore, when the machine-learning model is operating within the predefined limits, the processor may analyze the images using the machine-learning model. Additionally, prior to the analysis, the processor may map the images to a set of input images having associated formats that are compatible with the machine-learning model using one or more of the set of pre-processing transformations. For example, a given pre-processing transformation may be associated with at least a subset of the images based on an image context of at least the subset of the images, and the image context may include: a format of at least the subset of the images, and/or an image characteristic associated with at least the subset of the images.

In some embodiments, the instructions specify the image context, so that the given pre-processing transformation is applied by the processor to the subset of the images prior to the analysis using the machine-learning model. Alternatively, the processor may determine the image context after receiving the instructions, so that the given pre-processing transformation is applied by the processor to the subset of the images prior to the analysis using the machine-learning model. For example, the determination of the image context may be performed dynamically to improve a performance metric of the machine-learning model.

Moreover, when the machine-learning model is operating outside of the predefined limits, the processor may provide a notification to the other electronic device and may discontinue analysis of the images using the machine-learning model. Additionally, the electronic device may perform one or more remedial actions, including communicating with the other electronic device, so that the machine-learning model or a re-trained version of the machine-learning model can be operated within the predefined limits.

Furthermore, the reference input may include an image pre-processed using one of the set of pre-processing transformations.

Another embodiment provides the computer system.

Another embodiment provides a computer-program product for use with the electronic device or the computer system. This computer-program product includes instructions for at least some of the operations performed by the electronic device or the computer system.

Another embodiment provides a method for determining whether a machine-learning model is operating within predefined limits, which may be performed by the electronic device.

Another embodiment provides a method for providing the machine-learning model, which may be performed by the computer system.

The preceding summary is provided as an overview of some exemplary embodiments and to provide a basic understanding of aspects of the subject matter described herein. Accordingly, the above-described features are merely examples and should not be construed as narrowing the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

An electronic device may determine whether a machine-learning model is operating within predefined limits. In particular, the electronic device may receive, from another electronic device, instructions for the machine-learning model (such as a neural network), a reference input and a predetermined output of the machine-learning model for the reference input. For example, the instructions may be based on training performed in a different computing environment than that of the electronic device (i.e., the machine-learning model may be trained separately from the electronic device, such as on the other electronic device). Note that the instructions may include an architecture of the machine-learning model, weights associated with the machine-learning model, one or more libraries and/or a set of pre-processing transformations for use when executing the machine-learning model on images.

In response, the electronic device may configure the machine-learning model based on the instructions. Then, the electronic device may calculate an output of the machine-learning model for the reference input. Next, the electronic device may determine whether the machine-learning model is operating within predefined limits based on the output and the predetermined output. If yes, the electronic device may analyze the images using the machine-learning model; and if not the electronic device may provide a notification to the other electronic device and may discontinue analysis of the images using the machine-learning model.

By determining whether the machine-learning model is operating correctly, this computing technique may allow content (such as one or more features) in an image to be identified even when the machine-learning model is trained and then operated on different electronic devices (which may include different processors or different hardware) and/or in different environments (which may include different operating systems or different versions of an operating system). Consequently, the computing technique may provide flexible and accurate feature identification, and may improve the user experience when using the electronic device and/or the machine-learning model.

In the discussion that follows, an individual or a user may be a person. Also, or instead, the computing technique may be used by any type of organization, such as a business (which should be understood to include for-profit corporations), non-profit corporations, groups (or cohorts) of individuals, sole proprietorships, government agencies, partnerships, etc.

Moreover, in the discussion that follows, electronic devices and/or components in a system may communicate using a wide variety of communication protocols. For example, the communication may involve wired or wireless communication. Consequently, the communication protocols may include: an Institute of Electrical and Electronics Engineers (IEEE) 802.11 standard (which is sometimes referred to as 'Wi-Fi®,' from the Wi-Fi Alliance of Austin, Texas), Bluetooth® (from the Bluetooth Special Interest Group of Kirkland, Washington), another type of wireless interface (such as another wireless-local-area-network interface), a cellular-telephone communication protocol (e.g., a 3G/4G/5G communication protocol, such as UMTS, LTE), an IEEE 802.3 standard (which is sometimes referred to as 'Ethernet'), etc. In the discussion that follows, Ethernet and Wi-Fi are used as illustrative examples.

Figure 1:
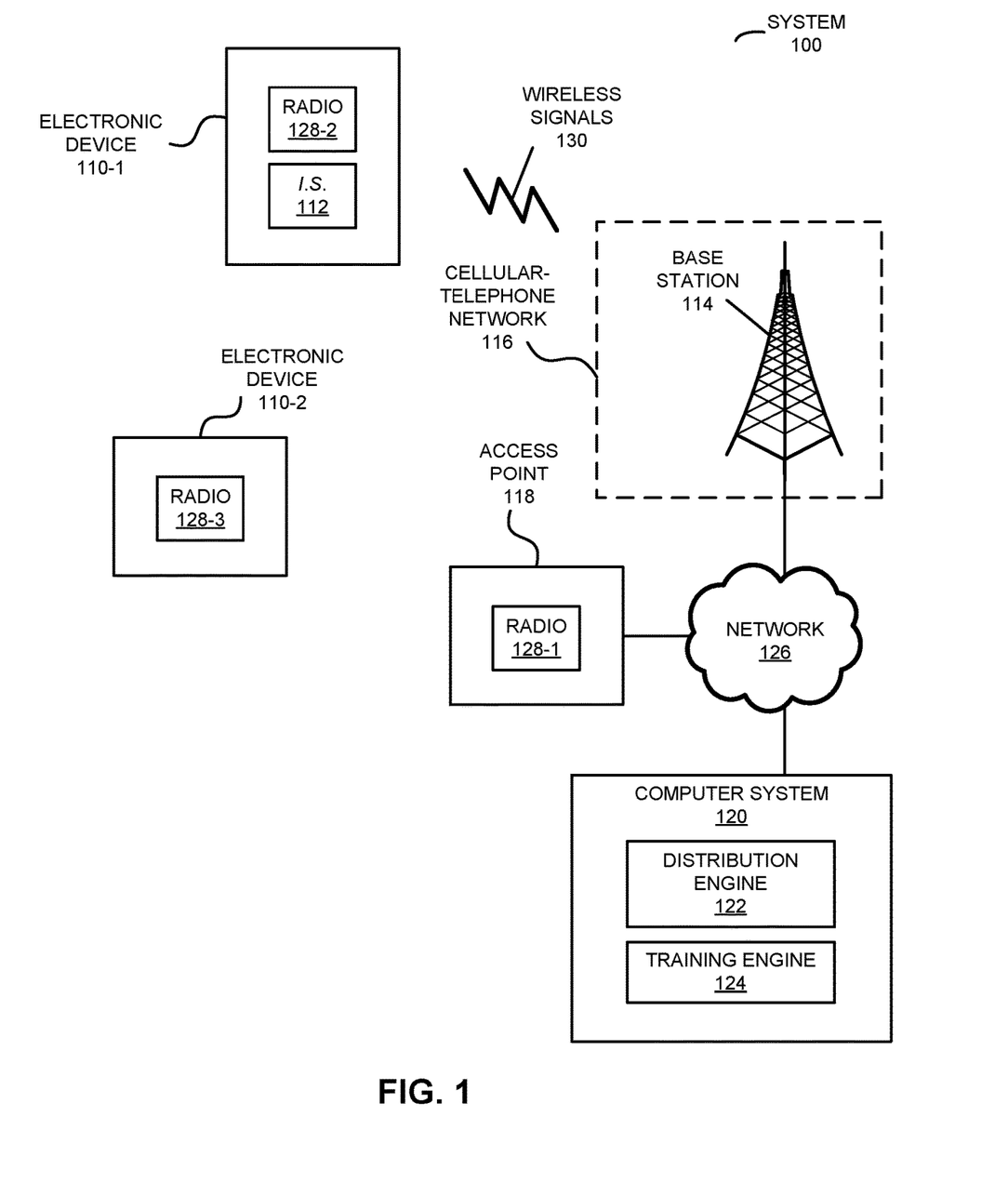
FIG. 1 is a block diagram illustrating an example of a system that trains and distributes one or more machine-learning models in accordance with an embodiment of the present disclosure.

Communication among electronic devices is shown in FIG. 1, which presents a block diagram illustrating a system 100 that trains and distributes one or more machine-learning models. In particular, system 100 includes one or more electronic devices 110 (such as portable electronic devices, e.g., cellular telephones) at least some of which may include an optional imaging sensor (I.S.) 112 (such as a CMOS image sensor, a CCD, a camera, etc.), optional base station 114 in cellular-telephone network 116, optional access point 118 and/or a computer system 120 (such as a server), which are sometimes collectively referred to as 'components' in system 100. Moreover, computer system 120 may include: a training engine (or module) 122, and a distribution engine (or module) 124.

Note that components in system 100 may communicate with each other via cellular-telephone network 116 and/or a network 126 (such as the Internet and/or a wireless local area network or WLAN). For example, distribution engine 124 in computer system 120 may provide one or more machine-learning models to one of electronic devices 110 (such as electronic device 110-1) via cellular-telephone network 116 and/or network 126. In addition, electronic device 110-1 may provide, via cellular-telephone network 116 and/or network 126, a notification (such as feedback about the operation of at least one of the one or more machine-learning models) to distribution engine 124. Thus, the communication in system 100 may be wired and/or wireless.

In embodiments where the communication involves wireless communication via a WLAN, the wireless communication includes: transmitting advertising frames on wireless channels, detecting another component in system 100 by scanning wireless channels, establishing connections (for example, by transmitting association requests, data/management frames, etc.), optionally configuring security options (e.g., Internet Protocol Security), and/or transmitting and receiving packets or frames via the connection (which may include information that specifies the one or more machine-learning models, the notification, etc.). Moreover, in embodiments where the communication involves wireless communication via cellular-telephone network 116, the wireless communication includes: establishing connections, and/or transmitting and receiving packets (which may include information that specifies the one or more machine-learning models, the notification, etc.).

Figure 6:
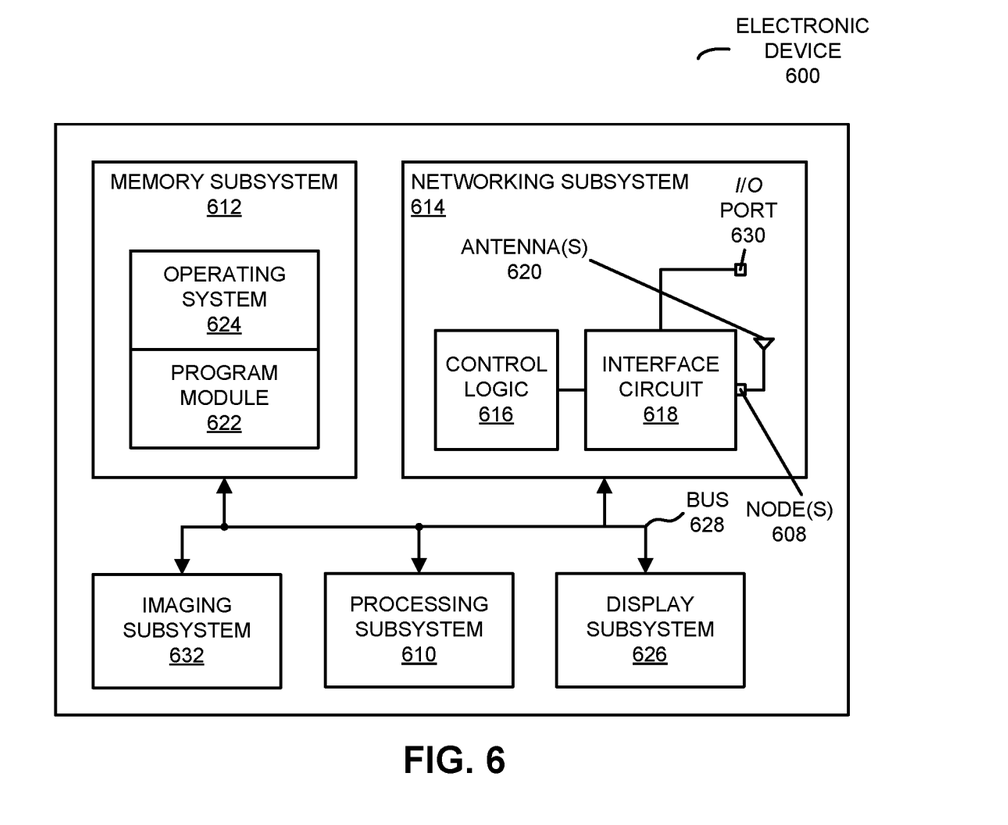
FIG. 6 is a block diagram illustrating an example of an electronic device in the system of FIG. 1 in accordance with an embodiment of the present disclosure.

As described further below with reference to FIG. 6, electronic devices 110, optional base station 114, optional access point 118 and/or computer system 120 may include subsystems, such as a networking subsystem, a memory subsystem and a processor subsystem. In addition, electronic devices 110, optional base station 114, optional access point 118 and/or computer system 120 may include radios 128 in the networking subsystems. More generally, the components can include (or can be included within) any electronic devices with the networking subsystems that enable these components to communicate with each other.

Moreover, as can be seen in FIG. 1, wireless signals 130 (represented by jagged lines) are transmitted by radios 128 in the components. For example, radio 128-1 in optional access point 118 may transmit information (such as frames or packets) using wireless signals 130. These wireless signals may be received by radios 128 in one or more of the other components, such as by electronic device 110-1. This may allow computer system 120 to communicate information to electronic device 110-1.

In the described embodiments, processing a packet or frame in a component may include: receiving the wireless signals with the packet or frame; decoding/extracting the packet or frame from the received wireless signals to acquire the packet or frame; and processing the packet or frame to determine information contained in the packet or frame (such as the one or more machine-learning models, the notification, etc.).

Note that the communication between at least any two of the components in system 100 may be characterized by one or more of a variety of performance metrics, such as: a received signal strength indication (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

As described previously, when the one or more machine-learning models are trained on computer system 120 by training engine 122 and then distributed to and executed on electronic devices 110, the differences in the platforms (including the specific hardware or processors, operating systems, versions of the operating systems or environments, etc.) can adversely impact the implementation and/or the performance of the one or more machine-learning models (and, thus, for example, the accuracy of features identified in images using the one or more machine-learning models). For example, when being trained the machine-learning model may include forward and back-propagation paths. However, when deployed in a different environment, there may only be a forward path. In addition, platform differences may result in errors or reduced accuracy of the machine-learning model because, e.g., different layers in the machine-learning model may not be synchronized internally, may have different resolutions (which can result in floating-point errors that accumulate during operation of the machine-learning model), etc.

Moreover, as described further below with reference to FIGS. 2-4, in order to address this problem, after training engine 122 trains a machine-learning model, distribution engine 124 may provide, to electronic device 110-1, instructions for the machine-learning model, a reference input and a predetermined output of the machine-learning model for the reference input. For example, the machine-learning model may be a neural network, the reference input may be one or more images, and the predetermined output may be one or more identified features in the one or more images. Note that the instructions may include an architecture of the machine-learning model, weights associated with the machine-learning model, one or more libraries and/or a set of pre-processing transformations for use when executing the machine-learning model on the one or more images. In response, electronic device 110-1 may configure the machine-learning model based on the instructions. Then, electronic device 110-1 may calculate an output of the machine-learning model for the reference input. Next, electronic device 110-1 may determine whether the machine-learning model is operating within predefined limits based on the output and the predetermined output.

When the machine-learning model is operating within the predefined limits (such as an accuracy, a difference or distance from a target, e.g., a mean-square accuracy, of at least 70, 80, 90 or 95%), electronic device 110-1 may analyze the one or more images using the machine-learning model. For example, after receiving one or more of the one or more images (which may have been acquired using imaging sensor 112), the machine-learning model may identify a feature in at least the one image. Note that the machine-learning model may be selected based on metadata associated with the one or more images (such as an image context associated with the one or more images, e.g., one or more formats and/or one or more image characteristics of the one or more images, etc.). (Alternatively, the machine-learning model may have been pre-selected or pre-specified before the one or more images were received or acquired by electronic device 110-1.)

In particular, the image context of the one or more images may be associated with or may include: a format (such as an aspect ratio, a resolution, a color space, etc.); a particular location (such as a fixed location or a variable location) of the source of the one or more images (i.e., a location of electronic device 110-1 when the one or more images were acquired); a type of the source (such as a type of imaging sensor 112); an identifier of the source; other features in the one or more images than the features (such as another object in the one or more images); an attribute of the one or more images (such as a location of a light source, a signal-to-noise ratio, a histogram of the light intensity in the one or more images, an f-number, another metric of the light intensity, an image-quality metric, etc.); and/or a time of day the i one or more mages were acquired. Then, if the metadata specifies one or more of these items, electronic device 110-1 can select the machine-learning model out of a set of available machine-learning models based on the metadata.

Additionally, prior to the analysis, electronic device 110-1 may map the one or more images to a set of input images having associated formats that are compatible with the machine-learning model using one or more of the set of pre-processing transformations. For example, a given pre-processing transformation may be associated with at least a subset of the one or more images based on an image context of at least the subset of the one or more images, and the image context may include: a format of at least the subset of the one or more images, and/or an image characteristic associated with at least the subset of the one or more images (such as an aspect ratio, a color-space representation, a resolution, a format, etc.).

In some embodiments, the instructions specify the image context, so that the given pre-processing transformation is applied by electronic device 110-1 to the subset of the one or more images prior to the analysis using the machine-learning model. (Therefore, the reference input may include one or more additional images pre-processed using at least one of the set of pre-processing transformations or that include instructions for pre-processing using at least one of the set of pre-processing transformations.) Alternatively or additionally, electronic device 110-1 may determine the image context after receiving the instructions, so that the given pre-processing transformation is applied by electronic device 110-1 to the subset of the one or more images prior to the analysis using the machine-learning model. For example, the determination of the image context may be performed dynamically to improve a performance metric of the machine-learning model (such as accuracy of feature identification).

Moreover, when the machine-learning model is operating outside of the predefined limits, electronic device 110-1 may provide a notification to distribution engine 124 in computer system 120 and may discontinue analysis of the one or more images using the machine-learning model.

Note that the machine-learning model may be implemented and executed on electronic device 110-1 using or in conjunction with hardware (such as a processor, a graphical processing unit or GPU, etc.) and/or a software application, such as image-acquisition software and/or image-analysis software. This software application may be a standalone application or a portion of another application that is resident on and that executes on electronic device 110-1 (such as a software application that is provided by electronic device 110-1 or that is installed on and that executes on electronic device 110-1). Alternatively or additionally, at least a portion of the software application executing on electronic device 110-1 may be an application tool that is embedded in the web page, and that executes in a virtual environment of a web browser. Thus, the application tool may be provided to a user of electronic device 110-1 via a client-server architecture. In an exemplary embodiment, the software application includes Caffe (from the Berkley Vision and Learning Center at the University of California, Berkley, California) and, more generally, a deep-learning framework.

Although we describe the network environment shown in FIG. 1 as an example, in alternative embodiments, different numbers or types of electronic devices may be present. For example, some embodiments comprise more or fewer components. As another example, in another embodiment, different components are transmitting and/or receiving packets or frames.

While computer system 120 provided the reference input and the predetermined output of the machine-learning model for the reference input to electronic device 110-1 in the preceding discussion, in other embodiments computer system 120 provides information that specifies a location (such as a uniform resource locator) where the reference input and the predetermined output can be accessed. Thus, in the computing technique, the reference input and the predetermined output may be directly or indirectly provided by computer system 120 to electronic device 110.

Figure 2:
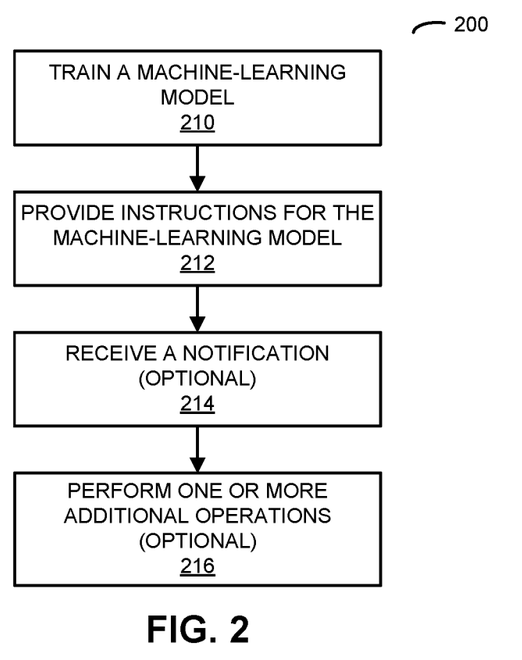
FIG. 2 is a flow diagram illustrating an example of a method for providing a machine-learning model in the system in FIG. 1 in accordance with an embodiment of the present disclosure.

FIG. 2 presents a flow diagram illustrating an example of a method 200 for providing a machine-learning model, which may be performed by a computer system (such as computer system 120 in FIG. 1). During operation, the computer system trains a machine-learning model (operation 210) using a training dataset. This training may iterate until a desired or target accuracy is achieved, such as 70, 80, 90 or 95%. For example, the machine-learning model may analyze one or more images in the training dataset to identify features and/or annotations (or tags), and the computer system may compare the identified features and/or annotations to known features and/or annotations for the images to determine the accuracy during an iteration of the training.

Then, the computer system may provide instructions for the machine-learning model to an electronic device (operation 212), along with a reference input and a predetermined output of the machine-learning model for the reference input. For example, the computer system may bundle the instructions, the reference input and the predetermined output into a wrapper. Note that the instructions for the machine-learning model may include an architecture of the machine-learning model, weights associated with the machine-learning model, one or more libraries and/or a set of one or more pre-processing transformations for use when executing the machine-learning model on the images.

In some embodiments, the computer system optionally receives a notification from the electronic device (operation 214) that indicates whether the machine-learning model operated within predefined limits (such as a specified accuracy, e.g., 70, 80, 90 or 95%). In response, the computer system optionally performs one or more optional additional operations (operation 216). For example, the feedback information in the notification may be used when training the same or other machine-learning models for deployment to the electronic device or other electronic devices. Thus, the computer system may also receive platform information about the electronic device, such as information that specifies the hardware, configuration, operating system, a version of the operating system, etc., which collectively specify the hardware and the software environment on this platform. This platform information may be used or referenced when training the same or other machine-learning models for deployment to the electronic device or other electronic devices. Alternatively or additionally, the computer system may provide information to the electronic device that can modify the configuration of the machine-learning model on the electronic device so that the machine-learning model operates within the predefined limits.

Figure 3:
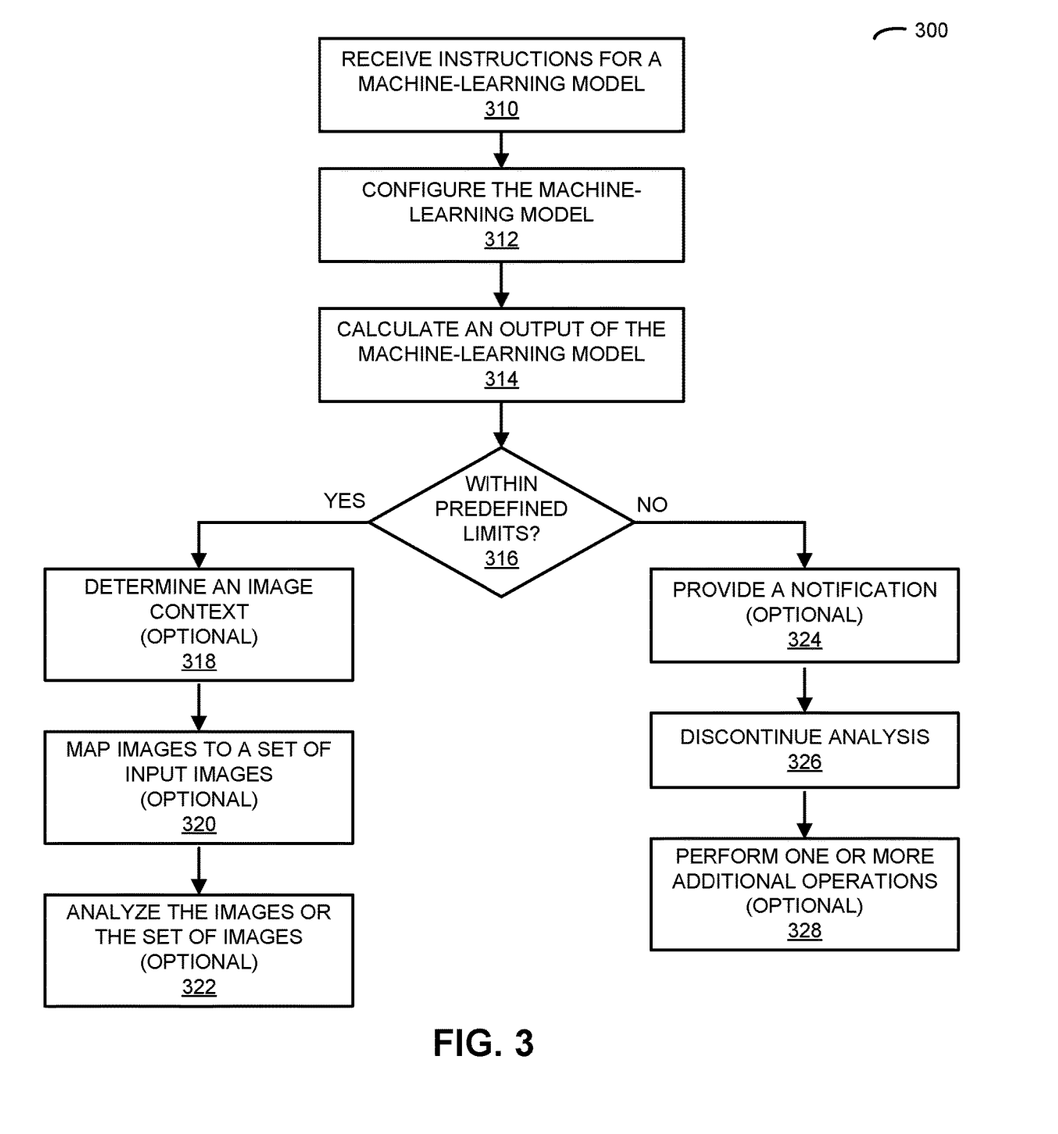
FIG. 3 is a flow diagram illustrating an example of a method for determining whether a machine-learning model is operating within predefined limits on an electronic device in the system in FIG. 1 in accordance with an embodiment of the present disclosure.

FIG. 3 presents a flow diagram illustrating an example of a method 300 for determining whether a machine-learning model is operating within predefined limits on an electronic device, which may be performed by the electronic device (such as electronic device 110-1 in FIG. 1). During operation, the electronic device receives, from another electronic device (such as the computer system or, indirectly, e.g., via a peer using distributed file sharing), instructions (operation 310) for a machine-learning model (such as a neural network and, more generally, a supervised-learning model or an unsupervised-learning model), a reference input and a predetermined output of the machine-learning model for the reference input, where the instructions include an architecture of the machine-learning model, weights associated with the machine-learning model, one or more libraries and/or a set of one or more pre-processing transformations for use when executing the machine-learning model on the images. As described previously, the instructions for the machine-learning model may be based on training performed in a different computing environment than that of the electronic device (such as in the other electronic device).

In response, the electronic device may configure the machine-learning model (operation 312) based on the instructions. For example, based on the instructions the electronic device may implement a configurable detector.

Then, the electronic device may calculate an output of the machine-learning model (operation 314) for the reference input.

Next, the electronic device may determine whether the machine-learning model is operating within the predefined limits (operation 316) based on the output and the predetermined output. For example, the electronic device may compare the output and the predetermined output to determine whether a desired or target accuracy has been achieved.

When the machine-learning model is operating within the predefined limits (operation 316), the electronic device may analyze images (operation 322) or a set of images using the machine-learning model. At least some of these images may have been acquired using an imaging sensor in the electronic device. Alternatively or additionally, at least some of the images may have been received from one or more additional electronic devices that include an imaging sensor.

In order for the machine-learning model to function properly (e.g., to operate within the predefined limits), an input to the machine-learning model may need to have or may be expected to have a particular format, such as an aspect ratio, a resolution, a color space, etc. This format may be based on how the machine-learning model was trained. In particular, the format may depend on an image context of a given image, such as a format and/or one or more image characteristics of the given image (therefore, different images may have different formats).

Consequently, prior to the analysis (operation 322), the electronic device may optionally map the images to a set of input images (operation 320) having associated formats that are compatible with the machine-learning model using one or more of the set of pre-processing transformations. For example, a given pre-processing transformation may be associated with at least a subset of the images based on an image context of at least the subset of the images, and the image context may include: an initial format of at least the subset of the images, and/or an image characteristic associated with at least the subset of the images.

In some embodiments, the instructions received from the other electronic device (operation 310) specify the image context, so that the given pre-processing transformation is applied by the electronic device (operation 320) to the subset of the images prior to the analysis using the machine-learning model (operation 322). (Therefore, the reference input may include an image pre-processed using one of the set of pre-processing transformations or may include information that specifies one of the set of pre-processing transformations to apply to the image prior to calculating the output of the machine-learning model in operation 314.)

Alternatively, the electronic device may optionally determine the image context (operation 318) after receiving the instructions (operation 310), so that the given pre-processing transformation is applied by the electronic device (operation 320) to the subset of the images prior to the analysis (operation 322) using the machine-learning model. For example, the determination of the image context (operation 318) may be performed dynamically to improve a performance metric of the machine-learning model as the images are acquired and/or received. In some embodiments, determining an image context of a given image involves the electronic device performing further analysis of the given image, such as: calculating a discrete Fourier transform, calculating a histogram, transforming the given image to log-normal coordinates, comparing the given image to a predefined color space, performing spatial-frequency filtering, performing another type of transformation, etc.

However, when the machine-learning model is operating outside of the predefined limits (operation 316), the electronic device may provide a notification (operation 324) to the other electronic device and may discontinue analysis of the images (operation 326) using the machine-learning model.

In some embodiments, the electronic device performs one or more optional additional operations (operation 328). For example, in response to the notification (operation 324), the electronic device may receive a revised version of the machine-learning model and/or may receive additional instructions from the other electronic device. In response, the electronic device may perform a remedial action so that the original or the revised version of the machine-learning model operates within the predefined limits.

In this way, the other electronic device and/or the electronic device (for example, software executed in an environment, such as an operating system, of the electronic device) may ensure that the machine-learning model is operating correctly by providing standard interfaces and checks (i.e., a gold standard). Consequently, the computing technique may enhance the user experience when using the electronic device.

In some embodiments of methods 200 and/or 300, there may be additional or fewer operations. Moreover, the order of the operations may be changed, and/or two or more operations may be combined into a single operation.

Figure 4:
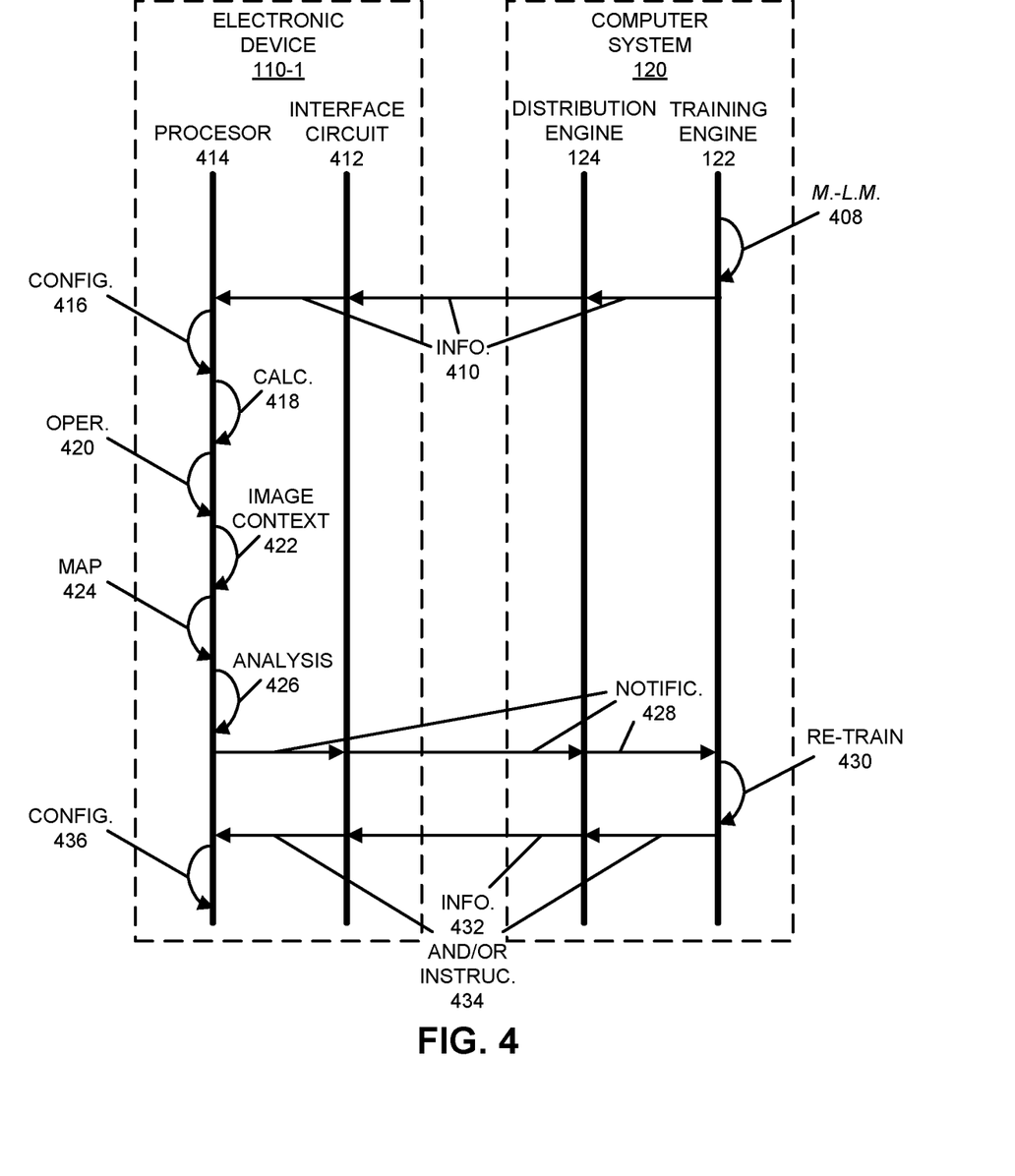
FIG. 4 is a drawing illustrating an example of communication among components in the system in FIG. 1 in accordance with an embodiment of the present disclosure.

Embodiments of the computing technique are further illustrated in FIG. 4, which presents a drawing illustrating an example of communication among components in system 100 (FIG. 1). In particular, during computing technique, training engine 122 in computer system 120 may train a machine-learning model 408 using a training dataset. Then, distribution engine 124 in computer system 120 may provide information 410, including instructions for machine-learning model (M.-L. M.) 408 (such as an architecture of machine-learning model 408, weights associated with machine-learning model 408, one or more libraries and/or a set of one or more pre-processing transformations for use when executing machine-learning model 408 on the images), a reference input and a predetermined output of machine-learning model 408 for the reference input, to electronic device 110-1.

After interface circuit 412 in electronic device 110-1 receives information 410, processor 414 in electronic device 110-1 may configure 416 machine-learning model 408 based on the instructions. Then, processor 414 may calculate 418 an output of machine-learning model 408 for the reference input.

Next, processor 414 may determine whether machine-learning model 408 is operating 420 within the predefined limits based on the output and the predetermined output.

When machine-learning model 408 is operating within the predefined limits, processor 414 may optionally map 424 one or more images to a set of input images having associated formats that are compatible with machine-learning model 408 using one or more of the set of pre-processing transformations. The one or more pre-processing transformations may be specified in the instructions. Alternatively, processor 414 may optionally determine one or more image contexts 422 of the one or more images, which then may be used to select one or more pre-processing transformations for use in mapping 424. Then, processor 414 may analyze 426 the one or more images using machine-learning model 408.

However, when the machine-learning model is operating 420 outside of the predefined limits, processor 414 may provide, via interface circuit 412, a notification 428 to computer system 120. Then, processor 414 may discontinue analysis of the images using machine-learning model 408.

Based on notification 428, computer system 120 and/or electronic device 110-1 may perform an optional remedial action. For example, training engine 122 may re-train 430 another version of machine-learning model 408 based on notification 428, and then distribution engine 124 may provide modified information 432 to electronic device 110-1, including instructions for the revised version of machine-learning model 408, another reference input and another predetermined output of the revised version of machine-learning model 408 for the other reference input, to electronic device 110-1. Alternatively or additionally, distribution engine 124 may provide corrective instructions 434 to electronic device 110-1 on actions electronic device 110-1 can take so that machine-learning model 110 operates within the predefined limits.

Furthermore, after interface circuit 412 receives information 432 and/or corrective instructions 434, processor 414 may modify configuration 416 based on corrective instructions 434 or may configure 436 the revised version of machine-learning model 408 based on the instructions in information 432.

In an exemplary embodiment, the machine-learning model in the computing technique includes a supervised-learning model or an unsupervised-learning model. Moreover, the machine-learning model may include or may be based on supervised or machine-learning techniques, such as: a neural network (e.g., a convolutional neural network), support vector machines, classification and regression trees, logistic regression, LASSO, linear regression and/or another (linear or nonlinear) supervised-learning technique. Furthermore, the machine-learning model may have: invariance to specific transformations (e.g., similarity transformations, affine transformations, etc.); robustness to photometric distortions and noise; computational efficiency; and, depending on the particular task, the ability to generalize to feature or object categories. Furthermore, the machine-learning model may include one or more of: an edge or a line-segment detector, a texture-based feature detector, a texture-less feature detector, a scale invariant feature transform (SIFT)-like object-detector, a speed-up robust-features (SURF) detector, a binary-descriptor (such as ORB) detector, a binary robust invariant scalable keypoints (BRISK) detector, a fast retinal keypoint (FREAK) detector, a binary robust independent elementary features (BRIEF) detector, a features from accelerated segment test (FAST) detector, a motion detector (such as a Gaussian-mixture model), etc.

The machine-learning model may be trained using labeled data, such as one or more instances of the feature and an associated tag in one or more images, as well as metadata associated with the images, such as: a location where an image was acquired, a type of source, an identifier of a particular source, an attribute of the image, image-quality metrics, a time of day, etc. For example, a training module executed by the computer system may perform hyper-parameter optimization in a multi-dimensional space of parameters to determine one or more machine-learning models (such as 1000 machine-learning models) based on labeled data and the metadata, so that the best performing machine-learning model(s) for particular features and/or images can be determined. Note that in some embodiments the machine-learning model(s) are trained using back propagation based on the labeled data.

Figure 5:
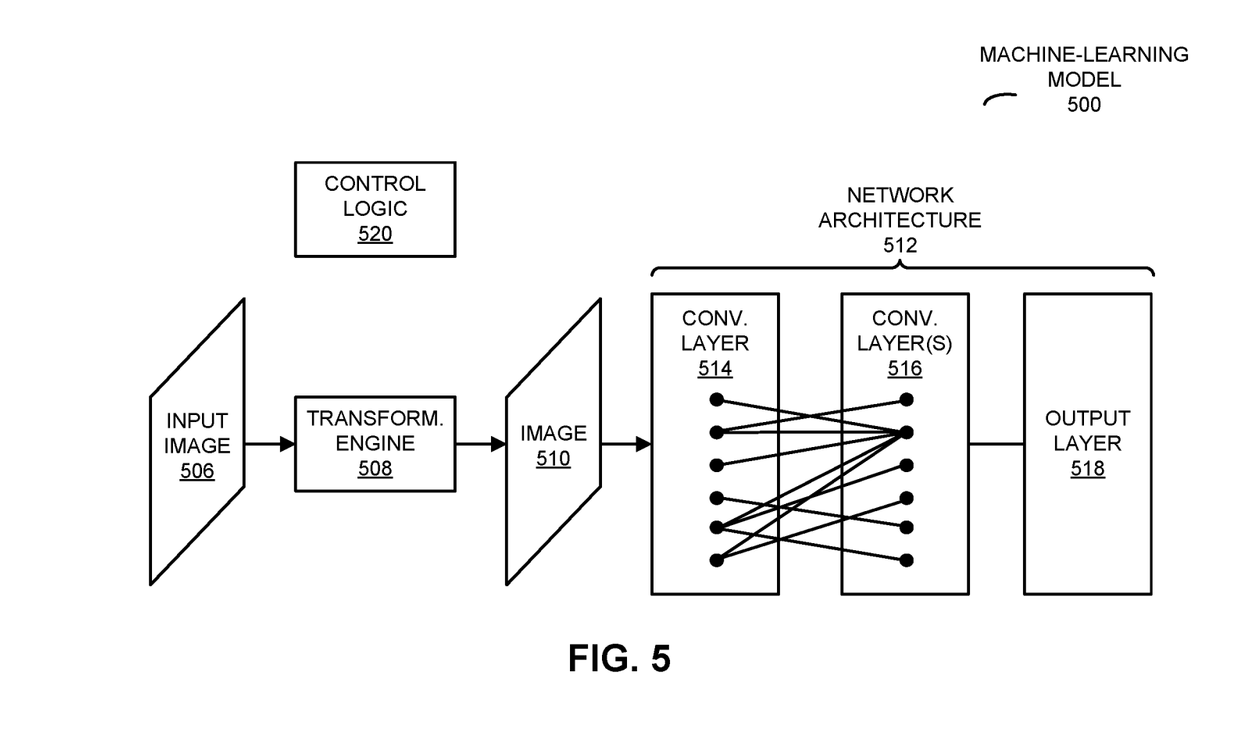
FIG. 5 is a drawing illustrating an example of a machine-learning model in accordance with an embodiment of the present disclosure.

As shown in FIG. 5, which presents a drawing illustrating an example of a machine-learning model 500. In particular, machine-learning model 500 may be implemented using a convolutional neural network. This neural network may include a network architecture 512 that includes: an initial convolutional layer 514 that provides filtering of image 510; an additional convolutional layer(s) 516 that apply weights; and an output layer 518 (such as a rectified linear layer) that performs classification (e.g., distinguishing a dog from a cat). Note that the details with the different layers in machine-learning model 500, as well as their interconnections, may define network architecture 512 (such as a directed acyclic graph). These details may be specified by the instructions for machine-learning model 500. In some embodiments, machine-learning model 500 is reformulated as a series of matrix multiplication operations.

Machine-learning model 500 may be able to handle the real-world variance in 1 million images or more. However, machine-learning model 500 may be trained or developed based on input image 510 having a particular format (such as 256×256 bits, i.e., a square aspect ratio). Thus, machine-learning model 500 may have an input receptive field that expects a particular type of input. Nonetheless, in general an initial input image 506 may have a different format. For example, relative to image 510, image 506 may have one of a variety of file formats (such as JPEG), a different size, a different resolution, etc. Thus, in order to analyze image 506 using machine-learning model 500, it may need to be transformed using one or more pre-processing transformations by transformation engine, module or circuit 508 into image 510. Note that the one or more pre-processing transformations may include: cropping (such as center cropping), mapping (such as rescaling), data augmentation (such as changing an aspect ratio), changing a color space (such as to RGB), changing a resolution (such as from greyscale [0, 255] to [0, 1] or [−0.5, 0.5]), etc.

As noted previously, the instructions for machine-learning model 500 may specify the one or more pre-processing transformations performed by transformation engine 508. Alternatively, control logic 520 may analyze image 506 to determine an image context and then, based on the image context, may select the one or more pre-processing transformations performed by transformation engine 508. Thus, in some embodiments, the one or more pre-processing transformations (and, more generally, front-end processing of image 506) may be optimized (such as by using hyper-parameter optimization).

Note that machine-learning model 500 may be used to analyze an image or a sequence of images, such as video acquired at a frame rate of, e.g., 700 frames/s.

We now describe an exemplary embodiment of a neural network. In a typical training regime, a large convolutional network model may include 60 M parameters and 650,000 neurons. The convolutional network model may include eight learned layers with weights, including five convolutional layers and three fully connected layers with a final 1000-way softmax that produces a distribution over the 1000 class labels. Some of the convolution layers may be followed by max-pooling layers. In order to make training faster, the convolutional network model may use non-saturating neurons (such as a local response normalization) and an efficient dual parallelized GPU implementation of the convolution operation. In addition, in order to reduce over-fitting in the fully-connected layers, a regularization technique (which is sometimes referred to as 'dropout') may be used. In dropout, the predictions of different models are efficiently combined to reduce test errors. In particular, the output of each hidden neuron is set to zero with a probability of 0.5. The neurons that are 'dropped out' in this way do not contribute to the forward pass and do not participate in backpropagation. Note that the convolutional network model may maximize the multinomial logistic regression objective, which may be equivalent to maximizing the average across training cases of the log-probability of the correct label under the prediction distribution.

In some embodiments, the kernels of the second, fourth, and fifth convolutional layers are coupled to those kernel maps in the previous layer that reside on the same GPU. The kernels of the third convolutional layer may be coupled to all kernel maps in the second layer. Moreover, the neurons in the fully connected layers may be coupled to all neurons in the previous layer.

Furthermore, response-normalization layers may follow the first and second convolutional layers, and max-pooling layers may follow both response-normalization layers as well as the fifth convolutional layer. A nonlinear model of neurons, such as Rectified Linear Units, may be applied to the output of every convolutional and fully-connected layer.

In an exemplary embodiment, the first convolutional layer filters a 224×224×3 input image with 96 kernels of size 11×11×3 with a stride of four pixels (this is the distance between the receptive field centers of neighboring neurons in a kernel map). Note that the second convolutional layer may take as input the (response-normalized and pooled) output of the first convolutional layer and may filter it with 256 kernels of size 5×5×48. Furthermore, the third, fourth, and fifth convolutional layers may be coupled to one another without any intervening pooling or normalization layers. The third convolutional layer may have 384 kernels of size 3×3×256 coupled to the (normalized, pooled) outputs of the second convolutional layer. Additionally, the fourth convolutional layer may have 384 kernels of size 3×3×192, and the fifth convolutional layer may have 256 kernels of size 3×3×192. The fully-connected layers may have 4096 neurons each. Note that the numerical values in the preceding and the remaining discussion below are for purposes of illustration only, and different values may be used in other embodiments.

In some embodiments, the convolutional network model is implemented using at least two GPUs. One GPU may run some of the layer parts while the other runs the remaining layer parts, and the GPUs may communicate at certain layers. The input of the convolutional network model may be 150,528-dimensional, and the number of neurons in the remaining layers in the convolutional network model may be given by 253,440-186,624-64,896-64,896-43,264-4096-4096-1000.

The convolutional network model may be pre-trained on a dataset, such as 'Imagenet,' may be repeatedly subjected to the per-application training image set and retrained using a backpropagation technique, in which errors in the output from the convolutional network model may be used as feedback to adjust the parameters in the convolutional network model until the detection output error reaches some minimum level (such as 1, 5, 10, 20 or 30%).

Once a trained detection model is available for a particular application, it can be deployed as part of the system or downloaded from the system for remote deployment (i.e., to one or more electronic devices, such as cellular telephones). When a model is deployed as part of the system, images input into the system may be analyzed using a particular machine-learning model based on the per-application configuration. The input images may then be processed by the previously trained per-application convolutional neural network to produce an output result unique to the application. Moreover, the output result may include a list of probabilities for the subject tags associated with the application. These can be interpreted as the probability that each of the subject tags for the application exists within the input image. In some embodiments, output coordinates specifying the location of the subjects in the input image can also be produced by the convolutional neural network.

While the images that are analyzed by the machine-learning model(s) may include content in the visible spectrum, in other embodiments other types of content may be analyzed. Thus, the input data may include a variety of other types of content, including: audio, measurements of an environmental condition (such as the temperature, humidity, barometric pressure, wind direction, wind speed, reflected sunlight, etc.), images associated with different wavelengths of light (such as infrared images, ultraviolet images or x-ray images), acoustic imaging (such as ultrasound or seismic measurements), radar images, an arbitrary type of data or information, etc. In some embodiments, the images are of at least a portion of an individual (instead of an environment). Thus, the images processed by the electronic device may include medical images or medical information, such as data from: computed tomography, magnetic resonance imaging, an electroencephalogram, an ultrasound, positron emission spectroscopy, an x-ray, etc.

Moreover, while the preceding discussion illustrated the use of a particular machine-learning model to analyze an image, in other embodiments a set of multiple machine-learning models are used concurrently. In this ensemble approach, over time the best performing machine-learning models or detectors for a particular image, feature and/or annotation may be identified from the set of machine-learning models.

Furthermore, in the preceding discussion, the source of the input data included a physical camera or an imaging sensor. However, in other embodiments the source may include a 'virtual camera', such as an electronic device, computer or server that provides images to the electronic device for analysis. Thus, the computing technique may be used to analyze images that have recently been acquired, to analyze images that are stored in the electronic device and/or to analyze images received from other electronic devices. For example, the computing technique may be used to analyze images associated with a social network of interacting individuals who exchange or post content, including images.

We now describe embodiments of an electronic device. FIG. 6 presents a block diagram illustrating an example of an electronic device 600, such as one of electronic devices 110, optional base station 114, optional access point 118 and/or computer system 120 in FIG. 1. This electronic device includes processing subsystem 610, memory subsystem 612, and networking subsystem 614. Processing subsystem 610 includes one or more devices configured to perform computational operations. For example, processing subsystem 610 can include one or more microprocessors, one or more GPUs, one or more application-specific integrated circuits (ASICs), one or more microcontrollers, one or more programmable-logic devices, and/or one or more digital signal processors (DSPs).

Memory subsystem 612 includes one or more devices for storing data and/or instructions for processing subsystem 610 and networking subsystem 614. For example, memory subsystem 612 can include dynamic random access memory (DRAM), static random access memory (SRAM), and/or other types of memory. In some embodiments, instructions for processing subsystem 610 in memory subsystem 612 include: one or more program modules or sets of instructions (such as program module 622 or operating system 624), which may be executed by processing subsystem 610. Note that the one or more computer programs may constitute a computer-program mechanism. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Figure 7:
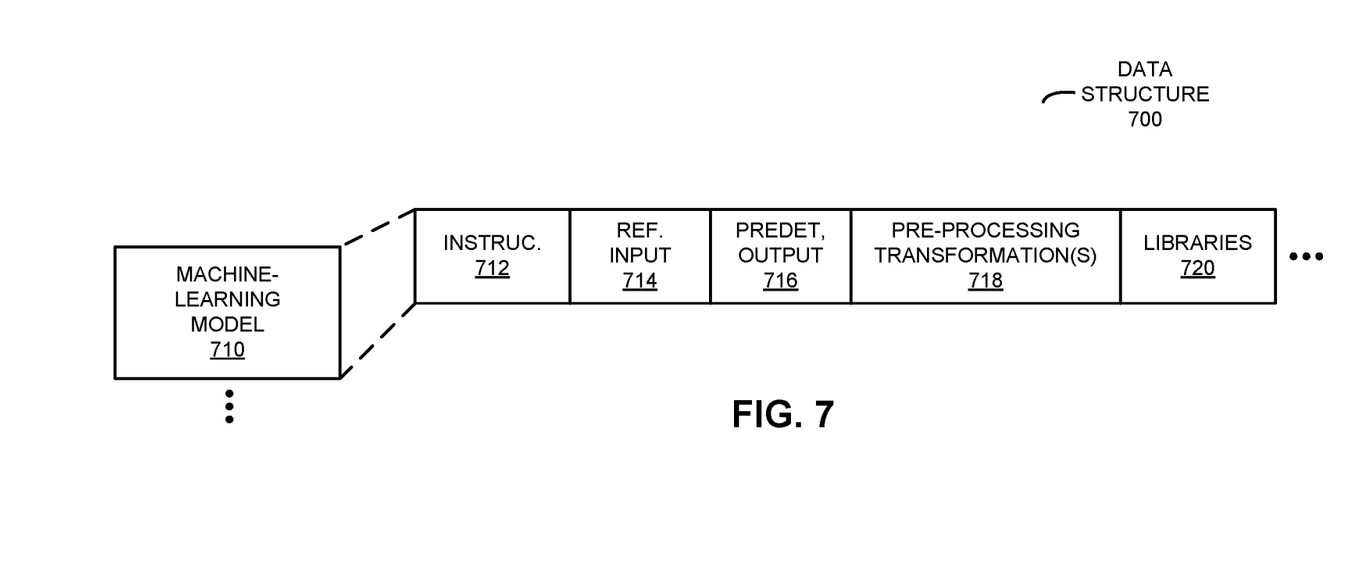
FIG. 7 is a drawing illustrating an example of a data structure that is used by the electronic device in FIG. 6 in accordance with an embodiment of the present disclosure.

Memory subsystem 612 may store information associated with one or more machine-learning models. This is shown in FIG. 7, which presents an example of a data structure 700. In particular, data structure 700 may include: instructions 712 for a machine-learning model 710 (such as a neural network), a reference input 714, a predetermined output 716 of machine-learning model 710 for reference input 714, optionally one or more pre-processing transformations 718 to apply to reference input 714, and/or optionally one or more libraries 720. Note that instructions 712 may include an architecture of machine-learning model 710 (which is sometimes referred to as a 'network architecture') and/or weights associated with machine-learning model 710.

Referring back to FIG. 6, networking subsystem 614 includes one or more devices configured to couple to and communicate on a wired and/or wireless network (i.e., to perform network operations), including: control logic 616, an interface circuit 618, one or more antennas 620 and/or input/output (I/O) port 630. (While FIG. 6 includes one or more antennas 620, in some embodiments electronic device 600 includes one or more nodes 608, e.g., a pad, which can be coupled to one or more antennas 620. Thus, electronic device 600 may or may not include one or more antennas 620.) For example, networking subsystem 614 can include a Bluetooth networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 600 may use the mechanisms in networking subsystem 614 for performing simple wireless communication between the electronic devices, e.g., transmitting advertising or beacon frames and/or scanning for advertising frames transmitted by other electronic devices as described previously.

Within electronic device 600, processing subsystem 610, memory subsystem 612, and networking subsystem 614 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc. Moreover, electronic device 600 may optionally include an imaging subsystem 632 with one or more imaging sensors for acquiring or capturing one or more images. (More generally, electronic device 600 may include a monitoring subsystem with one or more sensors for monitoring or measuring in an environment or of an individual.) Alternatively, electronic device 600 may receive the one or more images from another electronic device using networking subsystem 614.

Electronic device 600 can be (or can be included in) any electronic device with at least one network interface. For example, electronic device 600 can be (or can be included in): a desktop computer, a laptop computer, a subnotebook/netbook, a server, a tablet computer, a smartphone, a cellular telephone, a smartwatch, a consumer-electronic device, a portable computing device, an access point, a router, a switch, communication equipment, test equipment, a security camera, an aviation drone, a nanny camera, a wearable appliance, and/or another electronic device.

Although specific components are used to describe electronic device 600, in alternative embodiments, different components and/or subsystems may be present in electronic device 600. For example, electronic device 600 may include one or more additional processing subsystems, memory subsystems, networking subsystems, display subsystems and/or audio subsystems. Additionally, one or more of the subsystems may not be present in electronic device 600. Moreover, in some embodiments, electronic device 600 may include one or more additional subsystems that are not shown in FIG. 6. Also, although separate subsystems are shown in FIG. 6, in some embodiments, some or all of a given subsystem or component can be integrated into one or more of the other subsystems or component(s) in electronic device 600. For example, in some embodiments program module 622 is included in operating system 624.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 614, such as a radio. Moreover, the integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, receiving the input data, etc.)

While communication protocols compatible with Ethernet and Wi-Fi were used as illustrative examples, the described embodiments of the computing technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the computing technique may be implemented using program module 622, operating system 624 (such as a driver for interface circuit 618) and/or in firmware in interface circuit 618. Alternatively or additionally, at least some of the operations in the computing technique may be implemented in a physical layer, such as hardware in interface circuit 618.

In the preceding description, we refer to 'some embodiments.' Note that 'some embodiments' describes a subset of all of the possible embodiments, but does not always specify the same subset of embodiments. Moreover, note that the numerical values provided are intended as illustrations of the communication technique. In other embodiments, the numerical values can be modified or changed.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an interface circuit configured to communicate, via a network, with a second electronic device;
memory configured to store program instructions; and
a processor coupled to the interface circuit and the memory, wherein, when executed by the processor, the program instructions cause the electronic device to perform operations comprising:
receiving, from the second electronic device, instructions for a machine-learning model, a reference input and a predetermined output of the machine-learning model for the reference input, wherein the instructions include an architecture of the machine-learning model; and
determining whether the machine-learning model is operating on the electronic device within predefined limits on an accuracy of the machine-learning model based at least in part on a calculated output of the machine-learning model for the reference input and the predetermined output, wherein the predefined limits assess whether the machine-learning model is operating correctly on the electronic device based at least in part on the electronic device having at least one of a different processor, a different operating system or a different version of the operating system than a computer or a computer system that trained the machine-learning model and that is different from the electronic device.

2. The electronic device of claim 1, wherein the machine-learning model includes a neural network.

3. The electronic device of claim 1, wherein the operations further comprise, when the machine-learning model is operating outside of the predefined limits, performing a remedial action.

4. The electronic device of claim 1, wherein the operations further comprise:
when the machine-learning model is operating within the predefined limits, analyzing images using the machine-learning model.

5. The electronic device of claim 4, wherein the operations further comprise:
prior to the analysis, mapping the images to a set of input images having associated formats that are compatible with the machine-learning model using one or more of a set of pre-processing transformations that are associated with the machine-learning model.

6. The electronic device of claim 5, wherein a given pre-processing transformation is associated with at least a subset of the images based on an image context of at least the subset of the images; and wherein the image context includes at least one of: a format of at least the subset of the images, and an image characteristic associated with at least the subset of the images.

7. The electronic device of claim 6, wherein the instructions specify the image context, so that the given pre-processing transformation is applied to the subset of the images prior to the analysis using the machine-learning model.

8. The electronic device of claim 6, wherein the operations further comprise:
determining the image context after receiving the instructions, so that the given pre-processing transformation is applied to the subset of the images prior to the analysis using the machine-learning model.

9. The electronic device of claim 8, wherein the determination of the image context is performed dynamically to improve a performance metric of the machine-learning model.

10. The electronic device of claim 1, wherein the operations further comprise:
when the machine-learning model is operating outside of the predefined limits, providing a notification to the second electronic device and discontinuing analysis of images using the machine-learning model.

11. The electronic device of claim 1, wherein the reference input comprises an image pre-processed using one of a set of pre-processing transformations that are associated with the machine-learning model.

12. A non-transitory computer-readable storage medium for use in conjunction with an electronic device, the computer-readable storage medium configured to store program instructions that, when executed by the electronic device, causes the electronic device to determine whether a machine-learning model is operating within predefined limits by performing operations comprising:
receiving, from a second electronic device, instructions for the machine-learning model, a reference input and a predetermined output of the machine-learning model for the reference input, wherein the instructions include an architecture of the machine-learning model; and
determining whether the machine-learning model is operating on the electronic device within predefined limits on an accuracy of the machine-learning model based at least in part on a calculated output of the machine-learning model for the reference input and the predetermined output, wherein the predefined limits assess whether the machine-learning model is operating correctly on the electronic device based at least in part on the electronic device having at least one of a different processor, a different operating system or a different version of the operating system than a computer or a computer system that trained the machine-learning model that is different from the electronic device.

13. The computer-readable storage medium of claim 12, wherein the machine-learning model includes a neural network.

14. The computer-readable storage medium of claim 12, wherein the operations further comprise, when the machine-learning model is operating outside of the predefined limits, performing a remedial action.

15. The computer-readable storage medium of claim 12, wherein the operations further comprise:
when the machine-learning model is operating within the predefined limits, analyzing images using the machine-learning model.

16. The computer-readable storage medium of claim 15, wherein the operations further comprise:
prior to the analysis, mapping the images to a set of input images having associated formats that are compatible with the machine-learning model using one or more of a set of pre-processing transformations that are associated with the machine-learning model.

17. The computer-readable storage medium of claim 16, wherein a given pre-processing transformation is associated with at least a subset of the images based on an image context of at least the subset of the images; and
wherein the image context includes at least one of: a format of at least the subset of the images, and an image characteristic associated with at least the subset of the images.

18. The computer-readable storage medium of claim 17, wherein the instructions specify the image context, so that the given pre-processing transformation is applied to the subset of the images prior to the analysis using the machine-learning model.

19. The computer-readable storage medium of claim 17, wherein the operations further comprise:
determining the image context after receiving the instructions, so that the given pre-processing transformation is applied to the subset of the images prior to the analysis using the machine-learning model.

20. A method for determining whether a machine-learning model is operating within predefined limits, the method comprising:
by an electronic device:
receiving, from a second electronic device, instructions for the machine-learning model, a reference input and a predetermined output of the machine-learning model for the reference input, wherein the instructions include an architecture of the machine-learning model; and
determining whether the machine-learning model is operating on the electronic device within predefined limits on an accuracy of the machine-learning model based at least in part on a calculated output of the machine-learning model for the reference input and the predetermined output, wherein the predefined limits assess whether the machine-learning model is operating correctly on the electronic device based at least in part on the electronic device having at least one of a different processor, a different operating system or a different version of the operating system than a computer or a computer system that trained the machine-learning model that is different from the electronic device.

* * * * *